June 26, 1973 AKIO KOYANO 3,741,899

PIEZOELECTRIC CERAMICS

Filed Dec. 16, 1970 2 Sheets-Sheet 1

INVENTOR,
AKIO KOYANO

BY Watson, Cole, Grindle & Watson
ATTORNEYS

INVENTOR

Akio Koyano

BY

Watson, Cole, Grindle + Watson
ATTORNEY

United States Patent Office 3,741,899

Patented June 26, 1973

3,741,899

PIEZOELECTRIC CERAMICS

Akio Koyano, Mishima, Japan, assignor to Sumitomo Special Metal Company Limited, Osaka, Japan Continuation-in-part of abandoned application Ser. No. 713,081, Mar. 14, 1968. This application Dec. 16, 1970, Ser. No. 98,650

Claims priority, application Japan, Mar. 16, 1967, 42/16,516; Aug. 25, 1967, 42/54,660; Nov. 2, 1967, 42/70,734

Int. Cl. C04b *35/46, 35/48*

U.S. Cl. 252—62.9 6 Claims

ABSTRACT OF THE DISCLOSURE

A ceramic having excellent piezoelectric and dielectric characteristics obtained from a composition of $$Pb\{(Zn_{1/3}Nb_{2/3})_XTi_YZr_Z\}O_3$$

wherein $X+Y+Z=1$. The piezoelectric ceramic has a high curie point, improved piezoelectric characteristics as compared with the conventional $BaTiO_3$ ceramics, has good insulation resistance, and is easy to sinter as compared with $Pb(ZrTi)O_3$ ceramics, thereby being very useful in the industry. The radial coupling constant of the ceramic can be increased by including an additive of at least one member selected from the group consisting of $Na_2CO_3$, $Cu_2O$, $Ag_2O$, MgO, NiO, $Fe_2O$, $In_2O_3$, $SnO_2$, $Cr_2O_3$ and $Co_2O_3$ in a total quantity up to 5 mol percent of the composition or at least one member selected from the group consisting of $CaCO_3$, $SrCO_3$, and $BaCO_3$ in a total quantity up to 10 mol percent of the composition.

This is a continuation-in-part application of my copending application Ser. No. 713,081, filed Mar. 14, 1968, and now abandoned.

This invention relates to the ternary solid solution system of $$Pb(Zn_{1/3}Nb_{2/3})O_3—PbTiO_3—PbZrO_3$$

and its object is to obtain novel and improved piezoelectric ceramics.

Barium titanate and lead titanate-lead zirconate or lead titanate-lead zirconate-lead titanate ceramics have been used as favorable piezoelectric materials for various electro-mechanical transducers. However, the former has a low curie temperature and is poor in piezoelectric characteristics and the latter is so difficult to sinter as to provide very poor ceramics.

As a result of making various experiments from a viewpoint of discovering the novel piezoelectric materials which have no such inferior properties as mentioned above, I have discovered that a ceramic material easy to sinter and having improved piezoelectric and dielectric characteristics can be obtained from binary solid solution ceramics of $$Pb(Zn_{1/3}Nb_{2/3})O_3—PbTiO_3$$

and that, when $PbZrO_3$ and various kinds of additive elements are also added to the above mentioned binary solid solution ceramics, the piezoelectric characteristics are improved.

Figure 1:
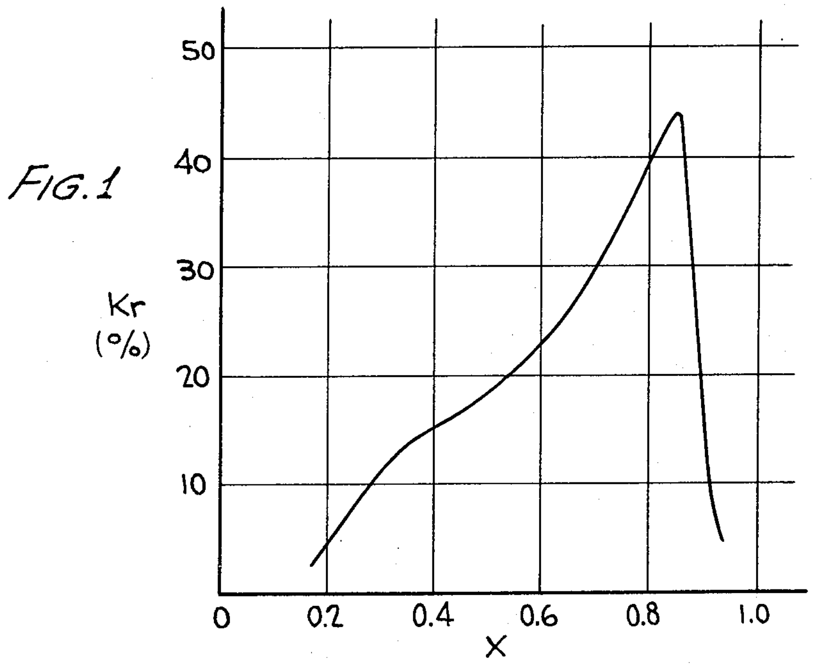
Figure 2:
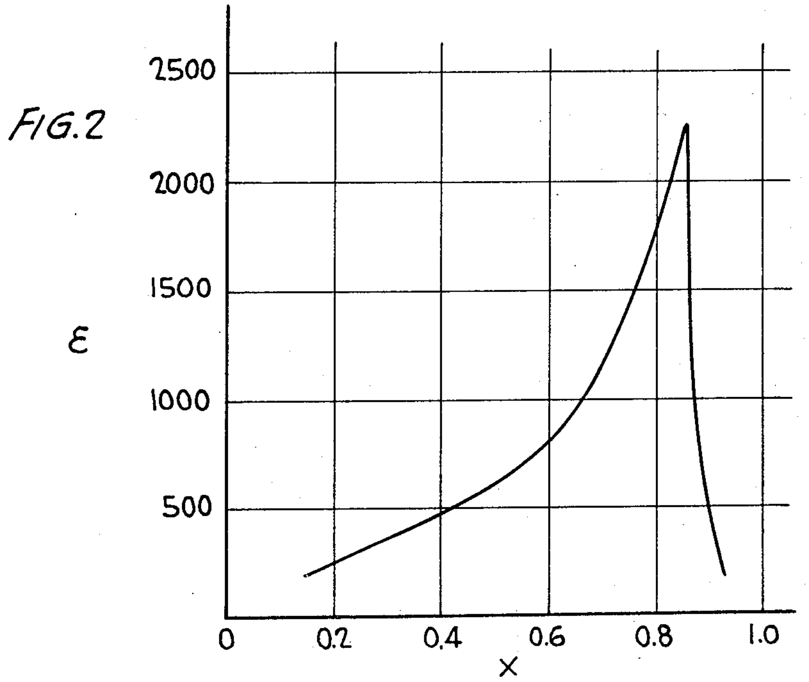
Figure 3:
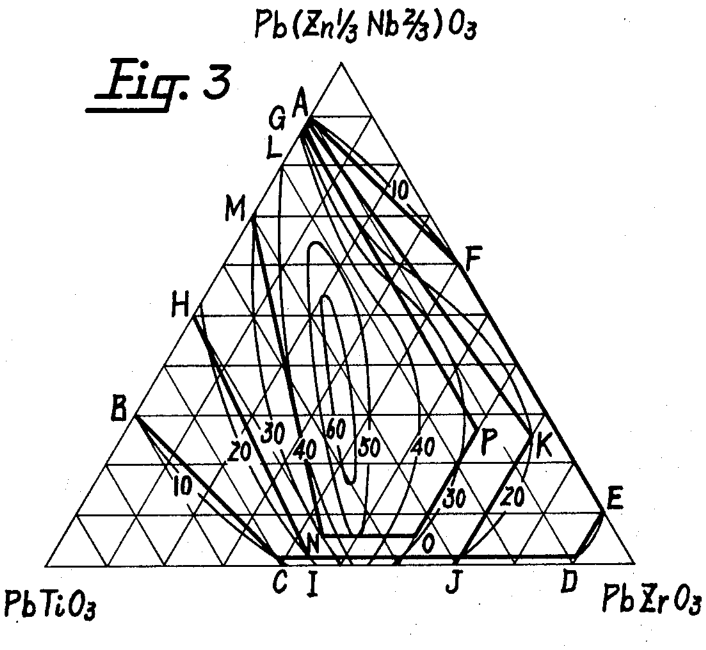
Figures 4, 5:
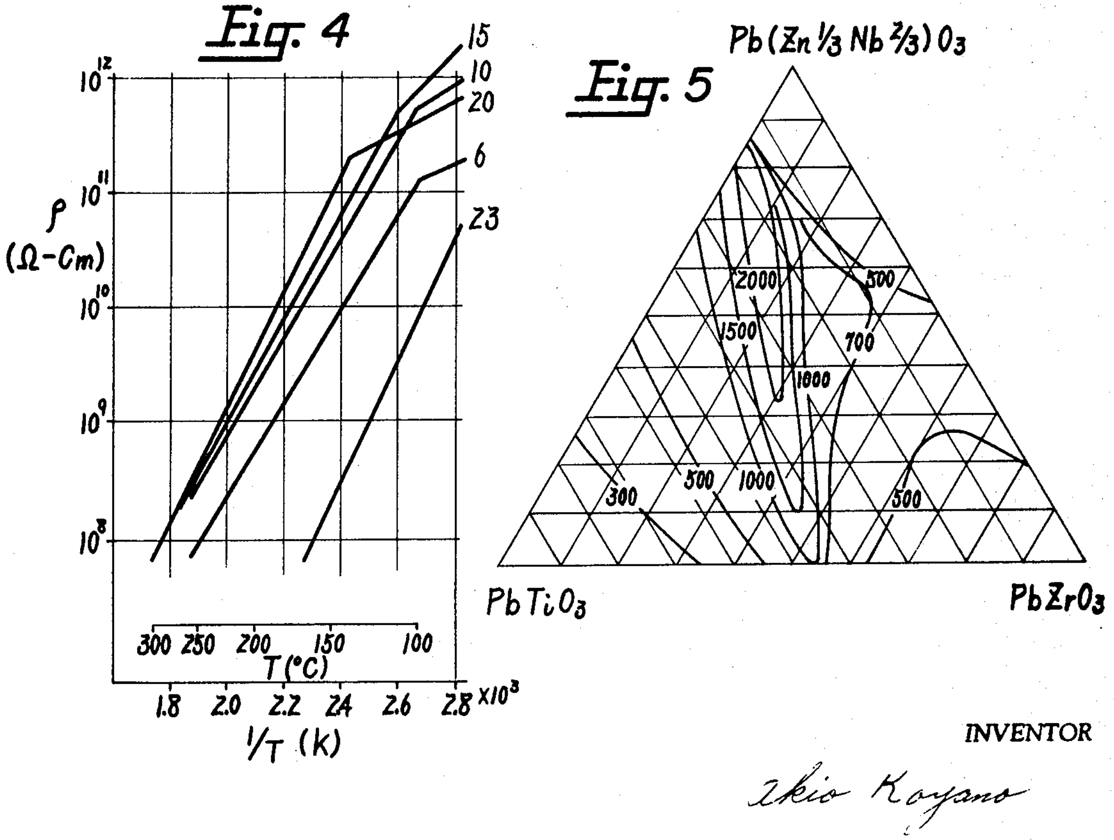

In the accompanying drawings:

FIGS. 1, 2, 3 and 4 are diagrams showing a radial electro-mechanical coupling constant and a dielectric constant of ceramic composition according to the present invention; and FIG. 5 is a diagram showing a temperature variation of an insulating resistance.

The present invention provides piezoelectric ceramics which are easy to sinter and which have improved piezoelectric and dielectric characteristics by limiting the composition within a polygonal region ABCDEF as shown in FIG. 3, the basic composition formula being represented by $$Pb(Zn_{1/3}Nb_{2/3})_XTi_YZr_ZO_3$$

wherein $X+Y+Z=1$, and $X>0.01$.

It is considered to be very difficult to sinter lead compounds such as lead titanate zirconate, because as lead oxide is evaporated at a sintering stage, uniform ceramics are hard to obtain. On the other hand, according to the present invention, uniform and compact ceramics can be easily obtained.

For instance, in the case of $X=0$ in the basic composition, as well known, the sintering process is usually carried out at 1250 to 1300° C. in a PbO atmosphere in order to prevent the evaporation of PbO, but uniformity is not maintained and good ceramics are not obtained easily. Especially when $X=0$ and $Z=0$, the sintering process is so difficult that useful ceramics cannot be obtained.

But by the increase of the amount of X, the solidus line is lowered and consequently the sintering proceeds at a low temperature so that uniform and compact ceramics are obtained.

For example, in the case of $X=0.5$, the optimum sintering temperature is about 1100° C. and favorable piezoelectric and dielectric characteristics are obtained. In view of the fact that generally the evaporation of PbO quickly increases above about 1200° C., the materials according to the present invention are more easy to sinter than the other ceramics such as lead titanate zirconate. Particularly in a range of $X>0.5$ the evaporation of PbO is negligible because the sintering temperature is lower than 1100° C. This is very useful to the piezoelectric ceramics industry.

Furthermore, the piezoelectric ceramics are generally used in the state of residual polarization. Accordingly, a high insulating resistance is required to obtain a saturation polarization and a high dielectric strength is required to prevent a break-down in the polarization stage. For this requirement the present ceramics have an insulating resistance of more than $10^{11}$ Ω-cm. and a dielectric strength of more than 50 kv./cm. at 100° C. Therefore they overcome the above mentioned difficulties.

Here, the complex compound of $$Pb(Zn_{1/3}Nb_{2/3})O_3$$

should only be discussed in the solid solution with $PbTiO_3$ and/or $PbZrO_3$, because on the basis of synthesizing theory it has a possibility of forming a perovskite structure and does not tend to assume a single phase by itself.

Examples shall be described in the following:

EXAMPLE 1

When an experimental composition was represented by $$Pb(Zn_{1/3}NB_{2/3})_XTi_YO_3$$

wherein $X+Y=1$, PbO, ZnO, $Nb_2O_3$ and $TiO_2$, each having high purity, and mixed in proper portion. The mixture was then calcined at 750° C. in the range of $X\geqq0.35$ and at 850° C. in the range of $X<0.35$ and thereafter crushed. The crushed mixture was pressed to form disks, each of which was 13 mm. in diameter and 2 mm. thick. The disks were then sintered, respectively, at a required temperature for one hour. The optimum sintering temperature was different depending on the respective compositions and lowered with the increase of X, as shown in Table 1, due to the lowering of the X solidus line with the increase of X. Therefore, it was not desirable to considerably exceed the optimum temperature shown in Table 1. For example, the sintering temperature was higher by 100° C. than shown in Table 1; the sample was deformed. After the sample was sintered, a silver electrode was fired on each surface of the disk and a direct current field of 50 kv./cm. was applied for 5 minutes in an oil bath at 100° C. to polarize the sample. In 24 hours after polarization, the measurement was carried out.

The results are shown in FIGS. 1, 2, 3, and 4 and the typical examples of them are shown in Table 1.

TABLE 1

| Ex. No. | Composition X | Sintering temp. (° C.) | Sintering density (gr./cm.$^3$) | Dielectric constant | Radial coupling constant (percent) | Curie temp. (° C.) |
|---|---|---|---|---|---|---|
| 1 | 0.2 | 1,210 | 7.21 | 225 | 5.0 | -------- |
| 2 | 0.3 | 1,150 | 7.88 | 329 | 11.2 | 405 |
| 3 | 0.5 | 1,080 | 8.02 | 565 | 18.3 | 345 |
| 4 | 0.7 | 1,025 | 8.13 | 1,152 | 29.0 | 275 |
| 5 | 0.84 | 980 | 7.80 | 2,100 | 43.2 | 190 |
| 6 | 0.86 | 950 | 7.71 | 2,080 | 43.0 | 170 |
| 7 | 0.9 | 950 | 7.74 | 460 | 13.2 | 165 |

As evident from Table 1 and FIGS. 3 and 4, improved ceramics having desirable piezoelectric and dielectric characteristics were obtained at a low sintering temperature where PbO evaporation is negligibly small. In practice, the value of Kr of the piezoelectric ceramic material is required to be more than 10%. This requirement can be satisfied by selecting the composition of the applicant's invention in a range of $0.3 \leqq X \leqq 0.9$.

Further, in a range of $0.5 \leqq X \leqq 0.89$ a value of Kr of more than 20% can be obtained. Particularly, in the range of $0.5 \leqq X \leqq 0.89$, not only favorable piezoelectric characteristics can be obtained, but also the optimum sintering temperature is lower than 1100° C. as above mentioned so that the PbO evaporation may practically be negligible. This is very useful in the industry, as compared with the conventional $PbTiO_3$—$PbZrO_3$ ceramics.

EXAMPLE 2

In a composition wherein $PbZrO_3$ is also solid dissolved in the basic composition disclosed in Example 1:

$$Pb(Zn_{1/3}Nb_{2/3})_X Ti_Y Zr_Z O_3$$

wherein $X+Y+Z=1$, the same treatment as described in Example 1 was applied varying the amounts of X, Y and Z.

The results are shown in FIGS. 3 and 4 and the typical examples of them are shown in Table 2. Some examples of the temperature variation of the insulating resistance are shown in FIG. 5.

The reference numerals given in FIG. 5 indicate the composition of the respective sample numbers shown in Table 2.

TABLE 2

| Ex. No. | Composition X | Composition Z | Sintering temp. (° C.) | Sintering density (gr./cm.$^3$) | Dielectric constant | Radial coupling constant (percent) |
|---|---|---|---|---|---|---|
| 8 | 0.75 | 0.05 | 1,040 | 7.93 | 2,245 | 42.3 |
| 9 | 0.75 | 0.06 | 1,040 | 7.95 | 2,453 | 49.6 |
| 10 | 0.75 | 0.075 | 1,040 | 7.99 | 2,340 | 41.5 |
| 11 | 0.75 | 0.1 | 1,040 | 7.72 | 1,120 | 32.1 |
| 12 | 0.75 | 0.125 | 1,040 | 7.50 | 910 | 29.3 |
| 13 | 0.625 | 0.13 | 1,080 | 8.06 | 2,063 | 46.7 |
| 14 | 0.625 | 0.14 | 1,080 | 8.09 | 2,485 | 51.4 |
| 15 | 0.625 | 0.15 | 1,080 | 7.83 | 2,537 | 56.1 |
| 16 | 0.625 | 0.16 | 1,080 | 8.04 | 2,278 | 57.0 |
| 17 | 0.625 | 0.17 | 1,080 | 7.94 | 2,005 | 50.7 |
| 18 | 0.625 | 0.20 | 1,080 | 7.87 | 1,013 | 39.6 |
| 19 | 0.625 | 0.23 | 1,080 | 7.73 | 820 | 29.3 |
| 20 | 0.5 | 0.21 | 1,120 | 8.00 | 2,450 | 59.8 |
| 21 | 0.5 | 0.225 | 1,120 | 8.23 | 2,045 | 61.2 |
| 22 | 0 | 0.525 | 1,275 | 7.23 | 1,010 | 44.2 |

The polarization was carried out at 50 kv./cm. for 5 minutes in the same manner as in Example 1 in the range of $X \geqq 0.01$. When $X < 0.01$, taking quick reduction of the breakdown voltage and insulating resistance into consideration, a direct current field of 40 kv./cm. was applied for 10 hours.

As can be seen from Table 2, the piezoelectric characteristics were further improved by the dissolution of $PbZrO_3$ in the binary system of $$Pb(Zn_{1/3}Nb_{2/3})O_3—PbTiO_3$$

and its effects are more definitely shown in FIGS. 3 and 4. Thus, as the result of further addition of $PbZrO_3$ to the above mentioned binary solid solution ceramics in the range of $X \geqq 0.5$ a good sinterability can be maintained, the sintering process at a low temperature of lower than about 1100° C., and the piezoelectric characteristics are further improved in the state wherein a favorable dielectric characteristic is maintained.

As mentioned above and as shown in FIG. 5, the insulating resistance of the ceramics of the present invention is extremely high at high temperature. This is desirable from the industrial viewpoint considering the fact that the polyarization has been carried out at such a high temperature as 100° C. to 200° C. to complete it within a short time.

EXAMPLE 3

In the basic composition formula $$Pb(Zn_{1/3}Nb_{2/3})_X Ti_Y Zr_Z O_3$$

wherein $X+Y+Z=1$, the experiment was carried out in the same manner as in Example 2 with the addition of a small amount of the additives. Said additives were selected from less than 10 mol percent of $CaCO_3$, $SrCO_3$, $BaCO_3$ and less than 5 mol percent of $Na_2CO_3$, $Cu_2O$, $Ag_2O$, MgO, NiO, $Cr_2O_3$, $Co_2O_3$, $Fe_2O_3$, $In_2O_3$ and $SnO_2$.

In this experiment the raw materials were prepared by using all of Ca, Sr, Ba and Na in the form of carbonates. The carbonates of these elements were used only because they are readily obtained commercially. Accordingly, the raw material to be used in the present invention is not limited to the carbonates and can be replaced by all compounds such as hydroxides which become oxides when baked and have the same effect as the carbonate.

As evident from Table 3, by the addition of less than 10 mol percent of $CaCO_3$, $SrCO_3$ or $BaCO_3$ or less than 5 mol percent of $Na_2CO_3$, $Cu_2O$, $Ag_2O$, MgO, NiO, $Cr_2O_3$, $Fe_2O_3$, $In_2O_3$ or $SnO_2$ the radial coupling coefficient and dielectric constant are increased.

When the amount of the additive exceeds 10 mol percent of $CaCO_3$, $SrCO_3$ and $BaCO_3$ and 5 mol percent of the others, the insulating resistance drops whereby at the time of polarization the leakage current increases or the insulating breakdown occurs.

As disclosed in Example 3, it is found that the piezoelectric characteristics are further improved by adding $PbZrO_3$ and the slight amount of additive element to $Pb(Zn_{1/3}Nb_{2/3})O$—$PtTiO_3$ ceramics. It is generally preferable that the value of Kr is relatively high. However, various values of more than 10% are required according to practical usage. Such requirements can be satisfied by selecting the mixed composition in compliance with FIG. 3. The composition according to the present claim is defined to be within the polygonal region ABCDEF in FIG. 3, in the region of which the value of Kr is more than 10%. As aforementioned outside the line CD uniform and compact ceramics cannot be obtained easily and the insulating resistance is lowered so that polarization may be difficult to be carried out. And outside the lines BC, and ED the value of Kr becomes lower than 10%, the value of which being hardly usable and furthermore, outside the line FA inferior ceramics are obtained and Kr becomes less than 10%.

The points A, B, C, D, E and F are represented by the following compositions:

| | X | Y | Z |
|---|---|---|---|
| A | 0.9 | 0.1 | 0 |
| B | 0.3 | 0.7 | 0 |
| C | 0.01 | 0.59 | 0.4 |
| D | 0.01 | 0.09 | 0.9 |
| E | 0.1 | 0 | 0.9 |
| F | 0.6 | 0 | 0.4 |

As can be seen from the examples hereinbefore mentioned, with the ternary solid solution system of $$Pb(Zn_{1/3}Nb_{2/3})O_3—PbTiO—PbZrO_3,$$

novel and improved piezoelectric ceramics can be obtained. More specifically, by increasing the amount of $Pb(Zn_{1/3}Nb_{2/3})O_3$ in the range of 0.5–0.89 relative to a corresponding amount of $PbTiO_3$ of between 0.11 and 0.5 a considerable increase is obtained both for the relative coupling constant and the dielectric constant in comparison to piezoelectric compositions having lesser amounts of $Pb(Zn_{1/3}Nb_{2/3})O_3$. In particular, as illustrated in FIGS.

1 and 2, both the relative coupling constant and dielectric constant peak where the amount of $Pb(Zn_{1/3}Nb_{2/3})O_3$ is .84 ($X$=0.84). This is a result unknown to the prior art which has utilized a piezoelectric ceramic composition of essentially the same elements as applicant's composition, but with different quantities of $Pb(Zn_{1/3}Nb_{2/3})O_3$, $PbTiO_3$ and $PbZrO_3$.

| Ex. No. | Basic composition X | Basic composition Z | Additive | Mol percent | Sintering temp. (° C.) | Dielectric constant | Radial coupling constant percent | Mechanical quality factor (Qm) |
|---|---|---|---|---|---|---|---|---|
| | 0.84 | 0 | None | | 980 | 2,100 | 43.2 | 99 |
| 23 | 0.84 | 0 | $Na_2CO_3$ | 2 | 980 | 3,062 | 51.3 | 83 |
| 24 | 0.84 | 0 | $Cu_2O$ | 2 | 980 | 2,450 | 52.6 | 80 |
| 25 | 0.84 | 0 | $Ag_2O$ | 2 | 980 | 2,821 | 54.0 | 78 |
| 26 | 0.84 | 0 | $CaCO_3$ | 2.5 | 980 | 2,715 | 50.2 | 81 |
| 27 | 0.84 | 0 | $SrCO_3$ | 2.5 | 980 | 2,291 | 50.7 | 80 |
| 28 | 0.84 | 0 | $BaCO_3$ | 2.5 | 980 | 2,650 | 49.8 | 97 |
| 29 | 0.84 | 0 | MgO | 3 | 980 | 2,630 | 50.3 | 79 |
| 30 | 0.84 | 0 | NiO | 2 | 980 | 2,483 | 51.1 | 79 |
| 31 | 0.84 | 0 | $Cr_2O_3$ | 1 | 980 | 2,399 | 52.3 | 210 |
| 32 | 0.84 | 0 | $Co_2O_3$ | 1 | 980 | 2,110 | 53.3 | 680 |
| 33 | 0.84 | 0 | $Fe_2O_3$ | 2 | 980 | 2,970 | 58.6 | 87 |
| 34 | 0.84 | 0 | $In_2O_3$ | 1 | 980 | 2,430 | 52.1 | 89 |
| 35 | 0.84 | 0 | $SnO_2$ | 2 | 980 | 2,700 | 55.6 | 79 |
| | 0.625 | 0.16 | None | | 1,080 | 2,278 | 57.0 | 83 |
| 36 | 0.625 | 0.16 | $Na_2CO_3$ | 2 | 1,080 | 2,748 | 67.3 | 81 |
| 37 | 0.625 | 0.16 | $Cu_2O$ | 1.5 | 1,080 | 2,480 | 60.7 | 80 |
| 38 | 0.625 | 0.16 | $Ag_2O$ | 2 | 1,080 | 2,698 | 64.4 | 76 |
| 39 | 0.625 | 0.16 | $CaCO_3$ | 2.5 | 1,080 | 3,324 | 60.2 | 72 |
| 40 | 0.625 | 0.16 | $SrCO_3$ | 2.5 | 1,080 | 3,720 | 62.6 | 72 |
| 41 | 0.625 | 0.16 | $BaCO_3$ | 2.5 | 1,080 | 2,900 | 61.1 | 73 |
| 42 | 0.625 | 0.16 | MgO | 2 | 1,080 | 2,476 | 61.5 | 80 |
| 43 | 0.625 | 0.16 | NiO | 1 | 1,080 | 2,401 | 61.2 | 82 |
| 44 | 0.625 | 0.16 | $Cr_2O_3$ | 1 | 1,080 | 2,580 | 63.7 | 130 |
| 45 | 0.625 | 0.16 | $Co_2O_3$ | 1 | 1,080 | 2,024 | 61.0 | 625 |
| 46 | 0.625 | 0.16 | $Fe_2O_3$ | 1 | 1,080 | 2,916 | 68.7 | 79 |
| 47 | 0.625 | 0.16 | $In_2O_3$ | 1 | 1,080 | 2,613 | 62.6 | 120 |
| 48 | 0.625 | 0.16 | $SnO_2$ | 1 | 1,080 | 2,599 | 64.9 | 77 |
| | 0.375 | 0.2 | None | | 1,150 | 900 | 31.1 | 91 |
| 49 | 0.375 | 0.2 | $Na_2CO_3$ | 3 | 1,150 | 1,415 | 40.4 | 87 |
| 50 | 0.375 | 0.2 | $Cu_2O$ | 2 | 1,150 | 1,611 | 43.2 | 82 |
| 51 | 0.375 | 0.2 | $Ag_2O$ | 3 | 1,150 | 1,512 | 45.3 | 83 |
| 52 | 0.375 | 0.2 | $CaCO_3$ | 5 | 1,150 | 1,615 | 39.6 | 76 |
| 53 | 0.375 | 0.2 | $SrCO_3$ | 5 | 1,150 | 1,620 | 41.2 | 78 |
| 54 | 0.375 | 0.2 | $BaCO_3$ | 5 | 1,150 | 1,311 | 38.1 | 80 |
| | 0.375 | 0.2 | MgO | 5 | 1,150 | 1,230 | 42.8 | 81 |
| 55 | 0.375 | 0.2 | NiO | 3 | 1,150 | 1,263 | 40.3 | 83 |
| 56 | 0.375 | 0.2 | $Cr_2O_3$ | 2 | 1,150 | 924 | 34.8 | 590 |
| 57 | 0.375 | 0.2 | $Cr_2O_3$ | 5 | 1,150 | 911 | 32.0 | 1,172 |
| 58 | 0.375 | 0.2 | $Co_2O_3$ | 2 | 1,150 | 827 | 36.4 | 712 |
| 59 | 0.375 | 0.2 | $Co_2O_3$ | 5 | 1,150 | 653 | 29.8 | 1,214 |
| 60 | 0.375 | 0.2 | $Fe_2O_3$ | 1.5 | 1,150 | 1,960 | 42.6 | 87 |
| 61 | 0.375 | 0.2 | $In_2O_3$ | 2 | 1,150 | 1,017 | 40.6 | 316 |
| 62 | 0.375 | 0.2 | $In_2O_3$ | 5 | 1,150 | 989 | 32.7 | 528 |
| 63 | 0.375 | 0.2 | $SnO_2$ | 3 | 1,150 | 1,267 | 43.7 | 80 |
| | 0.375 | 0.315 | None | | 1,150 | 1,463 | 61.1 | 83 |
| 64 | 0.375 | 0.315 | $Na_2CO_3$ | 1 | 1,150 | 2,432 | 6.68 | 77 |
| 65 | 0.375 | 0.315 | $Na_2CO_3$ | 2 | 1,150 | 2,504 | 65.8 | 77 |
| 66 | 0.375 | 0.315 | $Cu_2O$ | 1 | 1,150 | 1,940 | 65.9 | 84 |
| 67 | 0.375 | 0.315 | $Ag_2O$ | 1 | 1,150 | 1,811 | 64.9 | 83 |
| 68 | 0.375 | 0.315 | $CaCO_3$ | 5 | 1,150 | 2,280 | 62.7 | 80 |
| 69 | 0.375 | 0.315 | $SrCO_3$ | 5 | 1,150 | 2,845 | 64.8 | 80 |
| 70 | 0.375 | 0.315 | $RaCO_3$ | 5 | 1,150 | 2,120 | 64.0 | 79 |
| 71 | 0.375 | 0.315 | MgO | 2.5 | 1,150 | 1.683 | 63.2 | 121 |
| 72 | 0.375 | 0.315 | NiO | 1 | 1,150 | 1,590 | 64.3 | 99 |
| 73 | 0.375 | 0.315 | $Cr_2O_3$ | 0.5 | 1,150 | 1,579 | 68.3 | 124 |
| 74 | 0.375 | 0.315 | $CO_2O_3$ | 0.5 | 1,150 | 1,252 | 65.2 | 156 |
| 75 | 0.375 | 0.315 | $CO_2O_3$ | 2 | 1,150 | 683 | 50.0 | 811 |
| 76 | 0.375 | 0.315 | $Fe_2O_3$ | 1 | 1,150 | 2,232 | 70.7 | 75 |
| 77 | 0.375 | 0.315 | $In_2O_3$ | 0.5 | 1,150 | 1,672 | 64.2 | 118 |
| 78 | 0.375 | 0.315 | $SnO_2$ | 1 | 1,150 | 1,788 | 66.1 | 93 |
| | 0.375 | 0.625 | None | | 1,150 | 590 | 15.3 | 480 |
| 79 | 0.375 | 0.625 | $NaCO_4$ | 4 | 1,150 | 942 | 30.2 | 296 |
| 80 | 0.375 | 0.625 | $Cu_2O$ | 3 | 1,150 | 887 | 28.7 | 340 |
| 81 | 0.375 | 0.625 | $Ag_2O$ | 2 | 1,150 | 942 | 36.8 | 373 |
| 82 | 0.375 | 0.625 | $Ag_2O$ | 4 | 1,150 | 796 | 31.1 | 315 |
| 83 | 0.375 | 0.625 | $CaCO_3$ | 5 | 1,150 | 1,011 | 26.3 | 280 |
| 84 | 0.375 | 0.625 | $SrCO_3$ | 5 | 1,150 | 1,220 | 30.2 | 305 |
| 85 | 0.375 | 0.625 | $BaCO_3$ | 5 | 1,150 | 899 | 24.6 | 313 |
| | 0.375 | 0.625 | MgO | 5 | 1,150 | 746 | 31.6 | 297 |
| 86 | 0.375 | 0.625 | NiO | 5 | 1,150 | 780 | 29.7 | 399 |
| 87 | 0.375 | 0.625 | $Cr_2O_3$ | 2 | 1,150 | 867 | 29.9 | 475 |
| 88 | 0.375 | 0.625 | $Co_2O_3$ | 1 | 1,150 | 815 | 31.6 | 390 |
| 89 | 0.375 | 0.625 | $Co_2O_3$ | 3 | 1,150 | 610 | 27.8 | 788 |
| 90 | 0.375 | 0.625 | $Fe_2O_3$ | 2.5 | 1,150 | 926 | 30.3 | 400 |
| 91 | 0.375 | 0.625 | $In_2O_3$ | 5 | 1,150 | 711 | 29.8 | 623 |
| 92 | 0.375 | 0.625 | $SnO_2$ | 3 | 1,150 | 1,060 | 39.2 | 411 |
| 93 | 0.375 | 0.625 | $SnO_2$ | 5 | 1,150 | 760 | 29.6 | 423 |
| | 0.125 | 0.45 | None | | 1,200 | 1,438 | 59.3 | 89 |
| 94 | 0.125 | 0.45 | $Na_2CO_3$ | 1 | 1,200 | 1,987 | 64.9 | 82 |
| 95 | 0.125 | 0.45 | $Cu_2O$ | 1 | 1,200 | 1,780 | 65.1 | 80 |
| 96 | 0.125 | 0.45 | $Ag_2O$ | 1 | 1,200 | 1,921 | 65.2 | 83 |
| 97 | 0.125 | 0.45 | $CaCO_3$ | 10 | 1,200 | 2,426 | 63.7 | 78 |
| 98 | 0.125 | 0.45 | $SrCO_3$ | 5 | 1,200 | 2,240 | 63.5 | 79 |
| 99 | 0.125 | 0.45 | $SrCO_3$ | 10 | 1,200 | 2,518 | 66.1 | 75 |
| 100 | 0.125 | 0.45 | $BaCO_3$ | 10 | 1,200 | 1,963 | 62.7 | 80 |
| 101 | 0.125 | 0.45 | MgO | 2 | 1,200 | 1,872 | 64.2 | 79 |
| 102 | 0.125 | 0.45 | NiO | 1 | 1,200 | 1,713 | 63.4 | 82 |
| 103 | 0,125 | 0.45 | $Cr_2O_3$ | 0.5 | 1,200 | 1,580 | 64.1 | 80 |
| 104 | 0.125 | 0.45 | $Co_2O_3$ | 0.5 | 1,200 | 1,672 | 63.8 | 99 |
| 105 | 0.125 | 0.45 | $Fe_2O_3$ | 1 | 1,200 | 1,899 | 64.5 | 77 |
| 106 | 0.125 | 0.45 | $In_2O_3$ | 0.5 | 1,200 | 1,716 | 63.7 | 115 |
| 107 | 0.125 | 0.45 | $SnO_2$ | 1 | 1,200 | 1,757 | 64.6 | 81 |

What is claimed is:

1. A piezoelectric ceramic composition consisting essentially of a solid solution of a material of the form $Pb(Zn_{1/3}Nb_{2/3})_XTi_YZr_ZO_3$ where $X+Y+Z=1$ having a composition within a polygonal region ABCDEF of FIG. 3 and an additive of at least one member selected from the group consisting of $Na_2CO_3$, $Cu_2O$, $Ag_2O$, MgO, NiO, $Fe_2O_3$, $In_2O_3$, $SnO_2$, $Cr_2O_3$ and $Co_2O_3$ in a total quantity up to 5 mol percent of said composition, said additive being present in an amount sufficient to increase the radial coupling constant of said material.

2. A piezoelectric ceramic composition consisting of essentially of a solid solution of a material of the form $Pb(Zn_{1/3}Nb_{2/3})_XTi_YZr_ZO_3$ where $X+Y+Z=1$ having a composition within a polygonal region ABCDEF of FIG. 3 and an additive of at least one member selected from the group consisting of $CaCO_3$, $SrCO_3$ and $BaCO_3$ in a total quantity up to 10 mol percent of said composition, said additive being present in an amount sufficient to increase the radial coupling constant of said material.

3. A piezoelectric ceramic composition consisting essentially of a solid solution of a material of the form $Pb(Zn_{1/3}Nb_{2/3})_XTi_YZr_ZO_3$ where $X+Y+Z=1$ having a composition within a polygonal region GHIJK of FIG. 3 and an additive of at least one member selected from the group consisting of $Na_2CO_3$, $Cu_2O$, $Ag_2O$, MgO, NiO, $Fe_2O_3$, $In_2O_3$, $SnO_2$, $Cr_2O_3$ and $Co_2O_3$ in a total quantity up to 5 mol percent of said composition, said additive being present in an amount sufficient to increase the radial coupling constant of said material.

4. A piezoelectric ceramic composition consisting essentially of a solid solution of a material of the form $Pb(Zn_{1/3}Nb_{2/3})_XTi_YZr_ZO_3$ where $X+Y+Z=1$ having a composition within a polygonal region GHIJK of FIG. 3 and an additive of at least one member selected from the group consisting of $CaCO_3$, $SrCO_3$ and $BaCO_3$ in a total quantity up to 10 mol percent of said composition, said additive being present in an amount sufficient to increase the radial coupling constant of said material.

5. A piezoelectric ceramic composition consisting essentially of a solid solution of a material of the form $Pb(Zn_{1/3}Nb_{2/3})_XTi_YZr_ZO_3$ where $X+Y+Z=1$ having a composition within a polygonal region LMNOP of FIG. 3 and an additive of at least one member selected from the group consisting of $Na_2CO_3$, $Cu_2O$, $Ag_2O$, MgO, NiO, $Fe_2O_3$, $In_2O_3$, $In_2O_3$, $SnO_2$, $Cr_2O_3$ and $Co_2O_3$ in a total quantity up to 5 mol percent of said composition, said additive being present in an amount sufficient to increase the radial coupling constant of said material.

6. A piezoelectric ceramic composition consisting essentially of a solid solution of a material of the form $Pb(Zn_{1/3}Nb_{2/3})_XTi_YZr_ZO_3$ where $X+Y+Z=1$ having a composition within a polygonal region LMNOP of FIG. 3 and an additive of at least one member selected from the group consisting of $CaCO_3$, $SrCO_3$ and $BaCO_3$ in a total quantity up to 10 mol percent of said composition, said additive being present in an amount sufficient to increase the radial coupling constant of said material.

References Cited

UNITED STATES PATENTS

| | | | |
|---|---|---|---|
| 3,403,103 | 9/1968 | Ouchi et al. | 252—62.9 |
| 3,068,177 | 12/1962 | Sugden | 252—62.9 |
| 3,219,583 | 11/1965 | Cook | 252—62.9 |
| 3,424,686 | 1/1969 | Ouchi et al. | 252—62.9 |
| 3,546,120 | 12/1970 | Ouchi et al. | 252—62.9 |
| 3,268,453 | 8/1966 | Ouchi et al. | 252—62.9 |

OTHER REFERENCES

Veda et al.: "Japanese Journal of Applied Physics," vol. 7, No. 3, pp. 236–42, March 1968.

OSCAR R. VERTIZ, Primary Examiner

J. COOPER, Assistant Examiner